United States Patent [19]

Dinur

[11] 4,423,838

[45] Jan. 3, 1984

[54] SELECTABLE SEPARATION AND CAPACITY IRRIGATION LINE

[75] Inventor: Eldad Dinur, Kibbutz Naan, Israel

[73] Assignee: Naan Mechanical Works, Kibbutz Naan, Israel

[21] Appl. No.: 231,177

[22] Filed: Feb. 4, 1981

[30] Foreign Application Priority Data

Feb. 4, 1980 [IL] Israel .......................................... 59305

[51] Int. Cl.³ ............................................ A01G 25/00
[52] U.S. Cl. .................................. 239/1; 137/236 R; 239/76; 239/542
[58] Field of Search ................ 239/76, 542, 547, 548, 239/567, 1, DIG. 1; 137/236 R

[56] References Cited

U.S. PATENT DOCUMENTS

| | | | |
|---|---|---|---|
| 1,577,225 | 3/1926 | Granger | 239/DIG. 1 X |
| 2,716,574 | 8/1955 | Chase | 239/547 |
| 3,917,174 | 11/1975 | Hildebrandt et al. | 239/542 |
| 3,981,452 | 9/1976 | Eckstein | 239/542 |
| 4,009,832 | 3/1977 | Tiedt | 239/542 |
| 4,123,006 | 10/1978 | Yukishita | 239/547 X |
| 4,166,580 | 9/1979 | Meckel | 239/542 |

FOREIGN PATENT DOCUMENTS

| | | |
|---|---|---|
| 2508865 | 9/1976 | Fed. Rep. of Germany . |
| 43357 | 8/1975 | Israel . |
| 1389971 | 4/1975 | United Kingdom ................ 239/542 |
| 1463276 | 2/1977 | United Kingdom . |
| 1479409 | 7/1977 | United Kingdom . |
| 1489001 | 10/1977 | United Kingdom . |
| 1509564 | 5/1978 | United Kingdom . |
| 2043417 | 10/1980 | United Kingdom . |
| 1578242 | 11/1980 | United Kingdom . |
| 2051533 | 1/1981 | United Kingdom . |

*Primary Examiner*—Andres Kashnikow
*Attorney, Agent, or Firm*—Browdy and Neimark

[57] ABSTRACT

An irrigation line having desired output flow characteristics therealong including a liquid flow conduit couplable to a source of liquid under pressure; a multiplicity of liquid discharge elements associated with the conduit along the length thereof and having their inputs coupled to the conduit at locations such that the flow rates of liquid through the individual discharge elements are in a desired proportional relationship. The individual capacities of the discharge elements may be varied as well.

11 Claims, 3 Drawing Figures

SELECTABLE SEPARATION AND CAPACITY IRRIGATION LINE

The present invention relates to irrigation apparatus generally and more particularly to irrigation lines to which are connected a plurality of irrigation devices along the length thereof.

It is well known that in the design of irrigation systems it is necessary to take into account the pressure losses in an irrigation line as well as pressure variations in such a line due to features of the topography of the irrigated area. The pressure losses of the irrigation line may be classified into two general types, the line losses, which are a function of the length of the line as well as of other factors and the device losses, which are a function of the type of irrigation devices used and their number.

Usually, it is desired to provide an uniform irrigation outflow per unit area of irrigated area. Most irrigation devices are designed such that their outflow is a function of the line pressure thereat. As noted above, pressure drops are produced in the line by losses. Topographical variations, such as sloping terrain, may produce pressure rises as well as drops. Thus the pressure at various points along an irrigation line may fluctuate in different directions.

It is known to compensate for pressure variations along an irrigation line by using pressure and flow regulators along the line. It is also known to employ irrigation pipe of decreasing diameter along the line to compensate for pressure rises due to downward slopes and to employ trench feeder lines with openings of variable diameters to compensate for line pressure losses.

Both of the above solutions involve significant cost and the latter involves complications in design and installation.

The present invention seeks to overcome the disadvantages of prior-art solutions to the problem of pressure variations in an irrigation line and provides an irrigation line which is tailored to overcome pressure variations.

There is thus provided in accordance with an embodiment of the present invention an irrigation line having desired output flow characteristics therealong comprising: a liquid flow conduit couplable to a source of liquid under pressure; a multiplicity of liquid discharge elements associated with the conduit along the length thereof and having their inputs coupled to the conduit at locations such that the flow rates of liquid through the individual discharge elements are in a desired proportional relationship.

Further in accordance with an embodiment of the present invention there is provided an irrigation line having desired output flow characteristics therealong comprising: a liquid flow conduit couplable to a source of liquid under pressure; a multiplicity of liquid discharge elements associated with the conduit along the length thereof and having differing output flow characteristics, the flow characteristics of the discharge elements being selected such that the flow rates of liquid through the discharge elements are in a desired proportional relationship.

Additionally in accordance with an embodiment of the invention both the flow characteristics and the location of the discharge elements may be selected to achieve the desired proportional relationship in output flow rates.

The liquid discharge elements may comprise drip irrigation emitters and may be integrally formed with the irrigation line. The desired flow rate relationship may be a uniform output flow per unit length within predetermined limits.

Additionally in accordance with an embodiment of the invention there is provided a method of forming an irrigation line having desired output flow characteristics comprising the steps of: providing a liquid flow conduit which is couplable to a source of pressurized liquid; associating with the liquid flow conduit a multiplicity of liquid discharge elements of selected flow characteristics at selected locations therealong, the characteristics and the locations being selected so as to provide a desired proportional relationship in the flow rates thereof.

Further in accordance with an embodiment of the present invention the above method includes varying only the flow characteristics, or only the locations or both.

Where the flow characteristics are varied, a plurality of different discharge elements may be used or a single discharge element may be selectably modified to have selectable discharge characteristics.

The invention will be more fully understood and appreciated from the following detailed description taken in conjunction with the drawing in which.

In accordance with the present invention, an irrigation line is provided with desired outflow characteristics therealong by varying the periodicity of the discharge elements therealong, varying the flow rates of the individual discharge elements or both in any desired combination.

Figure 1:
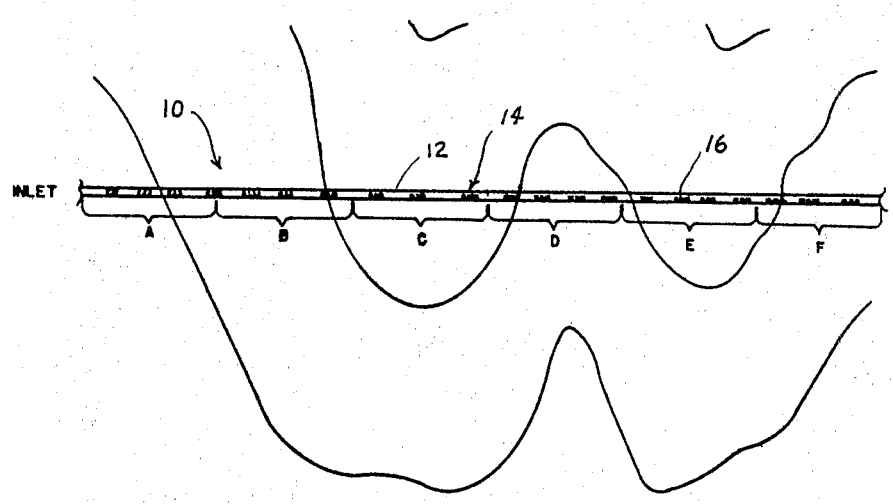
FIG. 1 is a schematic illustration of an irrigation line constructed and operative in accordance with an embodiment of the present invention.

FIG. 1 illustrates a preferred embodiment of the invention in the form of a drip irrigation line 10 comprising an extruded tube 12 having integrally formed therein at desired spaced intervals, discharge elements 14 in the form of inserts 16 which define in association with the tube 12, drip emitters. It is appreciated that the inserts 16 may be located at desired distances from each other along tube 12. It is also appreciated that inserts 16 of selectable and variable flow rates may be employed.

In accordance with a preferred embodiment of the invention the drip irrigation line may be constructed in accordance with the teachings of Israel Pat. No. 45211. Alternatively any other suitable construction and method of manufacture may be employed. Notwithstanding that the exemplary description of the invention is in the context of drip irrigation, it is appreciated that the invention is not limited to drip irrigation lines but may be applied to any other suitable type of irrigation line.

Conventionally it is known to perform calculations for drip irrigation lines in order to determine the maximum length of a line wherein the permissible variation in flow rates of the drippers does not exceed a predetermined limit. In such calculations, the characteristic flow rate of the drippers and the distance between them is maintained constant.

Conventionally the calculations take into account two types of pressure losses, local losses associated with each dripper and line losses as a function of the length of the line.

The local losses for each dripper are given by the following expression:

$$H_1 = K_2 \frac{v^2}{2g} \quad (1)$$

where
H₁ is the pressure loss for a given dripper
K₂ is a constant
v is the velocity in the line at a given location
g is the gravitational constant The line losses are given by the following empirical expression as an example:

$$H_2 = \frac{C_1}{D_t^{4.872}} \frac{Q_t}{c}^{1.852} L \quad (2)$$

where
H₂ is the pressure loss for a given length of tube
C₁ is a constant
D_t is the diameter of the tube
Q_t is the capacity of the tube
c is a constant governed by the surface characteristics of the inner surface of the tube
L is the length of tube Conventional calculations also take into account the topography of the land as producing pressure rises and drops along the line in determining the length limits for a dripper line having uniformly spaced uniform drippers.

In accordance with the present invention and in contrast to the prior art techniques and drip lines, it is possible to provide a custom designed drip line for a particular topographical situation and having desired output flow characteristics therealong.

The following is a program for a Texas Instruments T1-59 calculator which provides calculation of the positioning of dripper elements in a tube for producing generally uniform actual outflow per unit length therealong. The following entries are made:
A. water pressure
B. $8.52 \times 10^{-8}$
C. $8.112 \times 10^{-7}$
D. The separation between the last two dripper elements The program is designed for a tube having an inner diameter of 13.9 mm.

| (1) | (2) | (3) |
|---|---|---|
| 2nd LBL E | RCL 7 | STO 5 |
| STO 8 | $y^x$ | GTO 49 |
| R/S | 1.852 | 0 |
| 2nd LBL A | × | STO 7 |
| STO 1 | RCL 4 | STO 2 |
| STO 11 | × | 1 SUM 12 |
| R/S | RCL 5 | RCL 11 |
| 2nd LBL B | = | + |
| STO 3 | STO 10 | 3 |
| R/S | − | = |
| 2nd LBL C | | STO 11 |
| STO 4 | 4 | STO 1 |
| R/S | = | GTO 27 |
| 2nd LBL D | INV 2nd X ≧ t 163 | |
| STO 5 | RCL 10 | |

-continued

| (1) | (2) | (3) |
|---|---|---|
| R/S | STO 1 | |
| RCL 1 | RCL 5 | |
| $Y^x$ | SUM 2 | |
| .541 | RCL 9 | |
| × | ÷ | |
| .631 | RCL 5 | |
| ÷ | ÷ | |
| RCL 5 | RCL 6 | |
| = | − | |
| STO 6 | 1 | |
| 0.01 x ⇌ t | = | |
| RCL 1 | STO 13 | |
| $Y^x$ | 2nd |X| | |
| .541 | INV 2nd X ≧ t 49 | |
| × | R/S | |
| .631 | 200 | |
| = | − | |
| STO 9 | RCL 2 | |
| SUM 7 | = | |
| RCL 7 | 2nd X ≧ t 144 | |
| $X^2$ | R/S | |
| × | RCL 5 | |
| RCL 3 | + | |
| + | RCL 13 | |
| RCL 1 | ÷ | |
| + | RCL 13 | |
| RCL 8 | 2nd |X| | |
| × | × | |
| RCL 5 | .01 | |
| + | = | |
| (cont. with (2)) | (cont. with (3)) | |

The following is a program modification to the above program which adapts it for consideration of variation of the characteristic flow rate of the individual dripper elements:

| (1) | (2) |
|---|---|
| GTO 24 | RCL 14 |
| LRN | LRN |
| 2nd INS | GTO 156 |
| 2nd INS | LRN |
| 2nd INS | RCL 15 |
| 2nd INS | 2nd DEL |
| 2nd INS | SST |
| 2nd INS | STO 14 |
| 2nd LBL 2nd A' | LRN |
| STO 14 | GTO 181 |
| STO 15 | LRN |
| LRN | GTO 33 |
| GTO 41 | LRN |
| LRN | |
| RCL 14 | |
| 2nd DEL | |
| 2nd DEL | |
| LRN | |
| GTO 61 | |
| LRN | |
| RCL 14 | |
| 2nd DEL | |
| 2nd DEL | |
| LRN | |
| GTO 105 | |
| 2nd X ≧ t 164 | |
| LRN | |
| GTO 131 | |
| LRN | |
| 2nd X ≧ t 53 | |
| LRN | |
| GTO 142 | |
| LRN | |
| 2nd X ≧ t 146 | |
| SST | |
| RCL 14 | |
| LRN | |
| GTO 156 | |
| LRN | |

| -continued | |
|---|---|
| (1) | (2) |
| (cont. with (2)) | |

For purpose of illustrating the factors taken into account in the above calculations, FIG. 1 shows the irrigation line 10 superimposed on a conventional topographic chart which indicates that line 10 traverses regions A–F at differing levels.

If, for the purposes of illustration, one momentarily ignores the topographical factor, it may be appreciated that the pressure losses described hereinabove produce an increasing pressure loss with increasing distance from the water source. In order to compensate for this increasing pressure loss, in accordance with the present invention, the characteristic outflow rate per unit length of the irrigation line must be increased as a function of distance from the water source in order to maintain a constant actual outflow rate per unit length.

In practice the actual outflow rate that is realized is not absolutely constant but is caused to remain within predetermined acceptable limits.

The characteristic outflow rate of an irrigation line is determined by the characteristic flow rates of the discharge means disposed therealong as well as the placement periodicity of such discharge means. In accordance with the present invention either or both of the characteristic flow rate and the placement periodicity may be varied to selectably vary the characteristic outflow rate in order to obtain a desired actual outflow rate per unit length under conditions of varying line pressure.

Considering now the topographic factors indicated in FIG. 1 it is noted that region A is lower than region B and that region B is lower than region C. Region D is lower than region C and than region E. Region F is lower than region E.

In general it can be said that a decrease in level produces a pressure rise while an increase in level produces a pressure loss. These rises and losses interact with the pressure losses described above and enter the calculations described above as further variables determining what characteristic flow conditions must be designed into an irrigation line in order to obtain given actual flow characteristics from the irrigation line.

Figure 2:
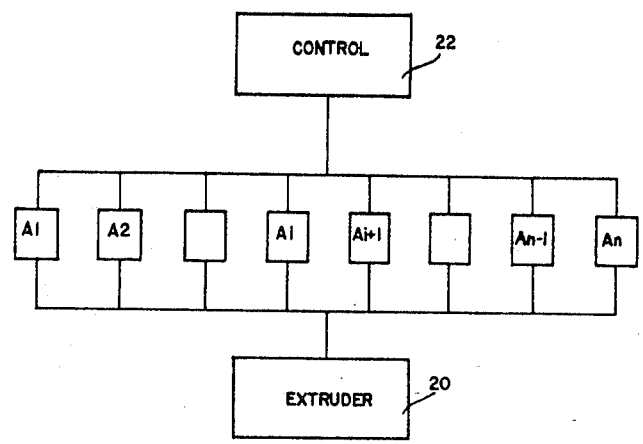
FIG. 2 is a schematic diagrammatic illustration of a method for producing an irrigation line having desired output flow characteristics in accordance with an embodiment of the present invention.

Reference is now made to FIG. 2, which illustrates in schematic form, apparatus for producing an integral drip irrigation line in accordance with an embodiment of the present invention. The apparatus comprises an extruding machine 20 which may be generally similar to that described in Israel Patent 45211 and which is operative to extrude a continuous tube in which are placed dripper elements at selected intervals.

Control circuitry, which may comprise a conventional process computer which may be programmed in accordance with the principles illustrated in the program described hereinabove is illustrated at reference numeral 22 and provides control signals which produce any combination of the following functions:

1. Instructions to extruding machine 20 to insert elements at a selected, variable periodicity.
2. Instructions to feeding apparatus comprising a plurality of bins $A_1$–$A_n$ each containing dripper elements of differing characteristic flow rates, to insert a selected one of such elements into the extruded tube at a given time.
3. Instructions to a dripper element modifier to modify a standard dripper element in such a way as to select its characteristic flow rate and to insert it into the extruded tube at a given time.

It may thus be appreciated that the apparatus of FIG. 2 is capable of producing a custom designed dripper line in accordance with the calculations described hereinabove in order to take into account local and line pressure losses as well as topographical effects. The custom designed dripper line may be selected to have actual outflow characteristics which are uniform per unit length within predetermined limits or which vary as desired.

It is appreciated that although the apparatus of FIG. 2 has been described in the context of the production of an extruded dripper tube having discrete inserts, the apparatus of FIG. 2 may equally be applied to any other type of irrigation line, including an irrigation line in which the drip or discharge means are defined by mere apertures or by embossed patterns in foils or in any other way.

Figure 3:
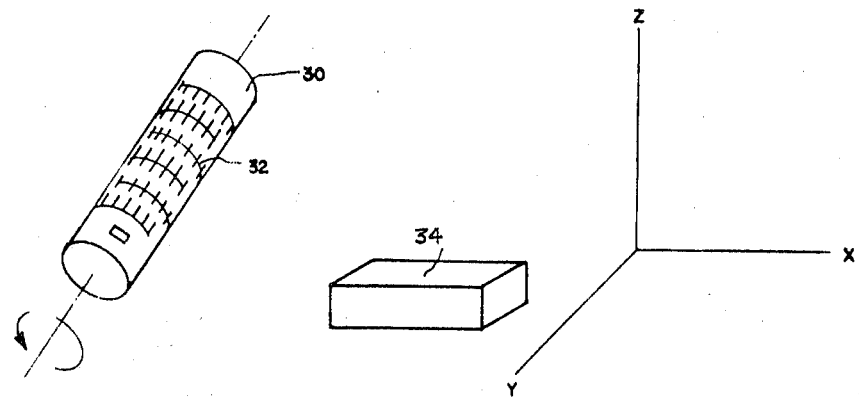
FIG. 3 is a schematic illustration of a selectably modifiable discharge element useful in accordance with an embodiment of the present invention.

Reference is now made to FIG. 3 which illustrates a modifiable dripper element and apparatus for modifying it. The dripper element is indicated by reference numeral 30 and has formed on a surface thereof a pressure reducing pathway 32. An impact die 34, which is selectably positionable in a three dimensional grid, is arranged to selectably engage the pressure reducing pathway so as to determine its characteristic output flow rate. This engagement may comprise the forming of an aperture therein to the exterior or the short-circuiting of a portion of the pathway. It is appreciated that alternatively any other desired technique for selecting the characteristic output flow rate of the discharge means may be employed in accordance with an embodiment of the invention.

The invention is not limited by what has been particularly shown and described above. Rather the scope of the invention is defined only by the claims which follow:

I claim:

1. A custom designed, topographically matched irrigation line having desired output flow characteristics therealong comprising:
    a liquid flow conduit couplable to a source of liquid under pressure and arranged to be disposed along a support surface having known topographical characteristics;
    a multiplicity of liquid discharge means associated with said conduit along the length thereof and having their inputs coupled to said conduits at selected fixed locations arranged along the length of said conduit so that the spacing between pairs of adjacent discharge means varies along the conduit in accordance with the topographical characteristics of the support surface for compensating for pressure changes therein produced by said topographical characteristics such that the flow rates of liquid through the individual discharge means per unit length of conduit over various portions of the conduit are in a desired proportional relationship.

2. An irrigation line according to claim 1 and wherein said liquid discharge means comprise drip irrigation emitters.

3. An irrigation line according to claim 1 and wherein said liquid discharge means comprise drip irrigation emitters and said irrigation line is integrally formed with said drip irrigation emitters.

4. An irrigation line according to claim 1 and wherein said liquid discharge means comprise drip irrigation emitters and said irrigation line comprises a continuous outer hose and said drip irrigation emitters are located at predetermined locations therealong and fixed thereat at the time of manufacture.

5. An irrigation line according to claim 1 and wherein said output flow rates are uniform per unit length along said line within predetermined limits.

6. Apparatus according to claim 1 and wherein said multiplicity of liquid discharge means include liquid discharge means having selected different flow characteristics.

7. A method for forming an irrigation line including a plurality of liquid discharge means and having desired output characteristics for disposition along a line having known topographical characteristics comprising the steps of:
selecting the range of permissible variation between the output of the discharge means at the beginning and at the end of the irrigation line;
determining on the basis, inter alia, of said topographical characteristics the pressure variation along said irrigation line as a function of spacing of said plurality of liquid discharge means therealong;
calculating on an iterative basis the spacing of said plurality of liquid discharge means along said irrigation line which produces the aforesaid range of permissible variation;
providing a liquid flow conduit which is couplable to a source of pressurized liquid; and
associating with said liquid flow conduit a multiplicity of liquid discharge means of selected flow characteristics at selected fixed locations therealong whereby the distance between pairs of adjacent discharge means varies along the conduit such that the flow rates of liquid through the individual discharge means per unit length of conduit are in a desired proportional relationship when disposed along said line having said known topographical characteristics.

8. A method according to claim 7 and wherein the output flow characteristics of individual ones of said discharge means differ from each other.

9. A method according to claim 7 and wherein said associating step includes the step of modifying a uniform discharge element so as to determine its output flow characteristics to be a selected one of a plurality of possible characteristics.

10. A method according to either of claims 7 and 9 wherein said associating step includes the step of selecting a discharge element of desired flow characteristics from a plurality of discharge elements having differing flow characteristics.

11. A method according to claim 7 wherein said associating step comprises the extrusion of a continuous tube about said discharge elements.

* * * * *